Oct. 1, 1935.   J. CLAUSEN   2,016,226

LIQUEFIER TANK AND METHOD OF SEALING SAME

Filed Jan. 27, 1932   2 Sheets-Sheet 1

INVENTOR.
Jens Clausen

BY Lancaster, Allwine and Rommel
ATTORNEYS.

Oct. 1, 1935.　　　　J. CLAUSEN　　　　2,016,226
LIQUEFIER TANK AND METHOD OF SEALING SAME
Filed Jan. 27, 1932　　　2 Sheets-Sheet 2
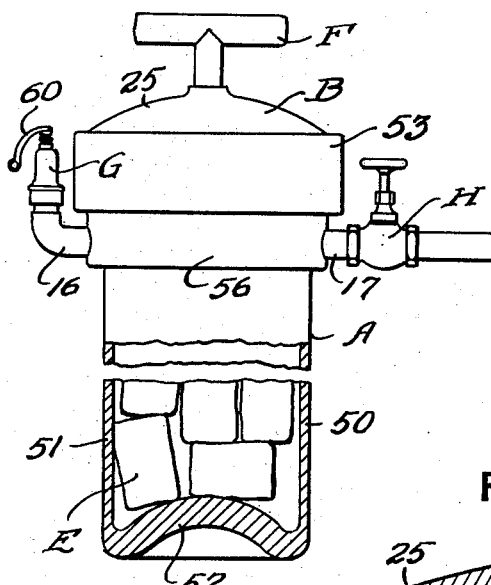
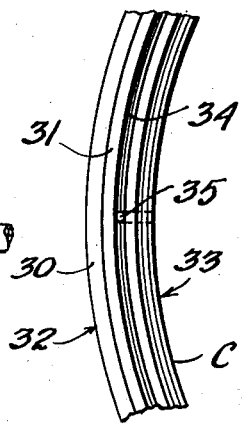
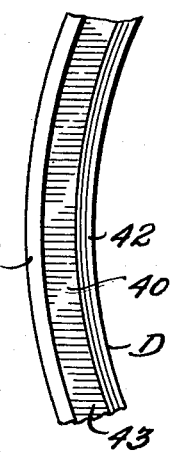
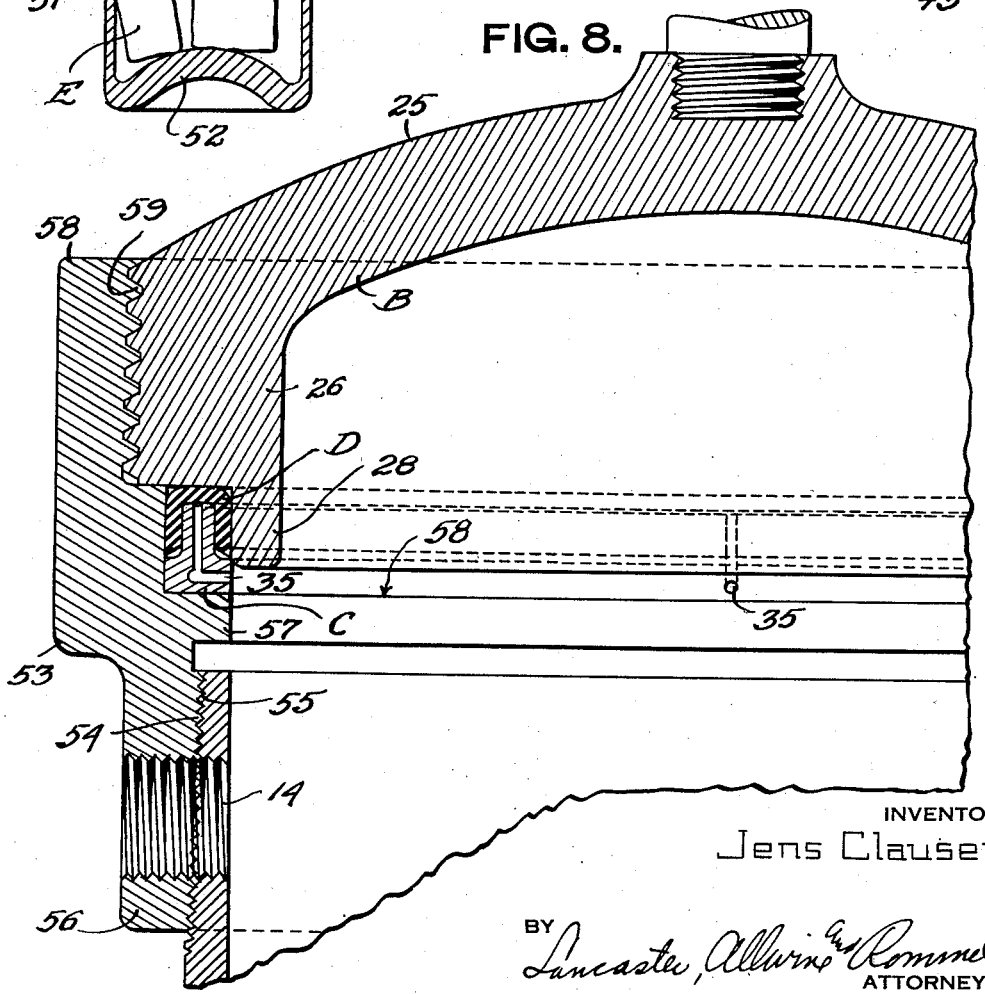
INVENTOR.
Jens Clausen
BY
Lancaster, Allwine & Rommel
ATTORNEYS.

Patented Oct. 1, 1935

2,016,226

UNITED STATES PATENT OFFICE 2,016,226

LIQUEFIER TANK AND METHOD OF SEALING SAME

Jens Clausen, Harrisburg, Pa., assignor to Harrisburg Steel Corporation, a corporation of Pennsylvania Application January 27, 1932, Serial No. 589,273

15 Claims. (Cl. 220—46)

The present invention relates to liquefier tanks, particularly well adapted for use with phase-changeable material, such as carbon dioxide ($CO_2$) which is suitably shipped, stored and vended in a solid or semi-solid phase, and in changing to a liquid phase gives off carbon dioxide gas; and to a method of sealing such tanks.

The principal objects of the invention are, to provide an improved means and method for sealing a liquefier tank against loss of its contents, by utilizing the evolved pressures therein, in such manner that the sealing remains effective even to the time when the pressure within the tank is substantially atmospheric.

A further object of this invention is the provision of a liquefier using a gasket which is capable of being inflated and/or distended into intimate sealing contact with the tank and its cover by pressures existing within the tank.

Other objects and advantages of the invention will appear in the following detailed description, taken in connection with the accompanying drawings, forming a part of the specification, and in which drawings:

Figure 5 is a fragmentary detailed view of a shaping ring, in top plan.

Figure 6 is a similar view in bottom plan of a portion of a gasket.

Figure 7 is a view similar to Figure 1, but showing a modified form of the invention.

Figure 8 is a view similar to Figure 2, showing details of the modification shown in Figure 7.

Figure 1:
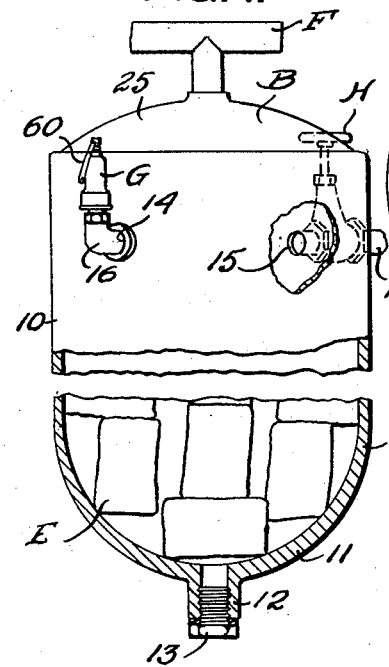
Figure 1 is a view, partly in elevation, and partly broken away and shown in section, of a liquefier tank constructed according to the present invention.
Figure 3:
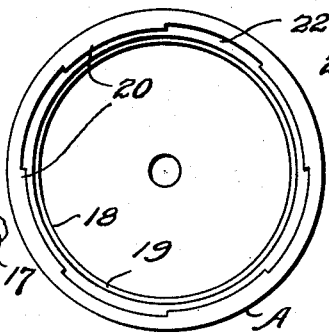
Figure 3 is a top plan view of the main body portion of the tank shown in Figure 1.
Figure 4:
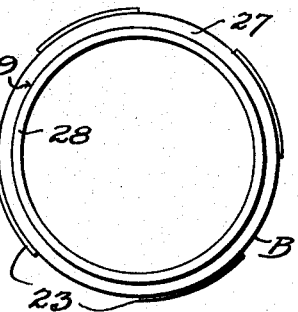
Figure 4 is a bottom plan view of the tank cover.

In the drawings, where similar reference characters designate like or similar parts thruout the views, A designates generally the tank, B the cover detachably carried thereby, C a shaping ring, D a gasket on ring C, cooperating with the tank and cover to seal the juncture of the cover with the tank, and E, phase changeable material, such as carbon dioxide, in solid or semi-solid form. The tank may be provided with suitable accessories, such as handle F for cover B, automatic safety and manually operable relief valve G, and valve H to control exit of the evolved gases from the tank.

Referring first to Figures 1–6, the tank A is preferably a seamless cylindrical forged metal body including a circular wall 10, having a downwardly extending dome-shaped bottom 11, which may terminate in a drainage nipple 12, closed by a plug 13. Adjacent its open upper end, the wall 10 may be provided with screw threaded outlet openings 14 and 15, the former receiving an elbow 16, supporting the valve G, and the latter provided with an outlet pipe 17, in which the valve H is disposed. At its interior, the wall 11 may be provided with an inwardly extending circumferential flange 18, providing an end facing shoulder 19. To permit of quick attachment and detachment of the cover B, the interior of wall 10, adjacent its open end, may be provided with a plurality of panels 20 of interrupted screw threads 21, these panels being spaced apart as shown at 22, for the reception of companion panels 23 of screw threads 24 formed on the cover B.

The cover B is preferably dome-shaped, as shown at 25, with the handle F at the crown, and is provided with a downwardly extending cylindrical portion 26 having a marginal face 27 confronting the shoulder 19. The cylindrical portion 26 may be provided with an annular flange 28, spaced inwardly from the marginal face 27, presenting a circumferential face 29 confronting the internal face of the tank A above shoulder 19. In order to place or remove the cover B, it is necessary to impart thereto a partial circumferential turn. When placing the cover, it may be lowered so that its cylindrical portion 26 extends into the tank, the panels 23 being received at spaces 22, and upon slight turn of the cover, the companion threads of the panels 20 and 23 will engage, thus detachably securing the cover to the tank.

The shaping ring C is preferably of metal, and preferably separable from the tank. In the example shown, it is of a size to rest upon the shoulder 19 of flange 18 and comprises a ring-shaped body 30 having an annular flange 31 normal to the plane of the ring, extending from its upper face, intermediate the inner and outer circumferential faces 32 and 33 of the ring. It is preferred to provide an annular groove 34 at the upper end face of flange 31, and one or more ports 35 leading from the inner circumferential face 33 of the ring, to the annular groove 34, for a purpose to be subsequently set forth.

Figure 2:
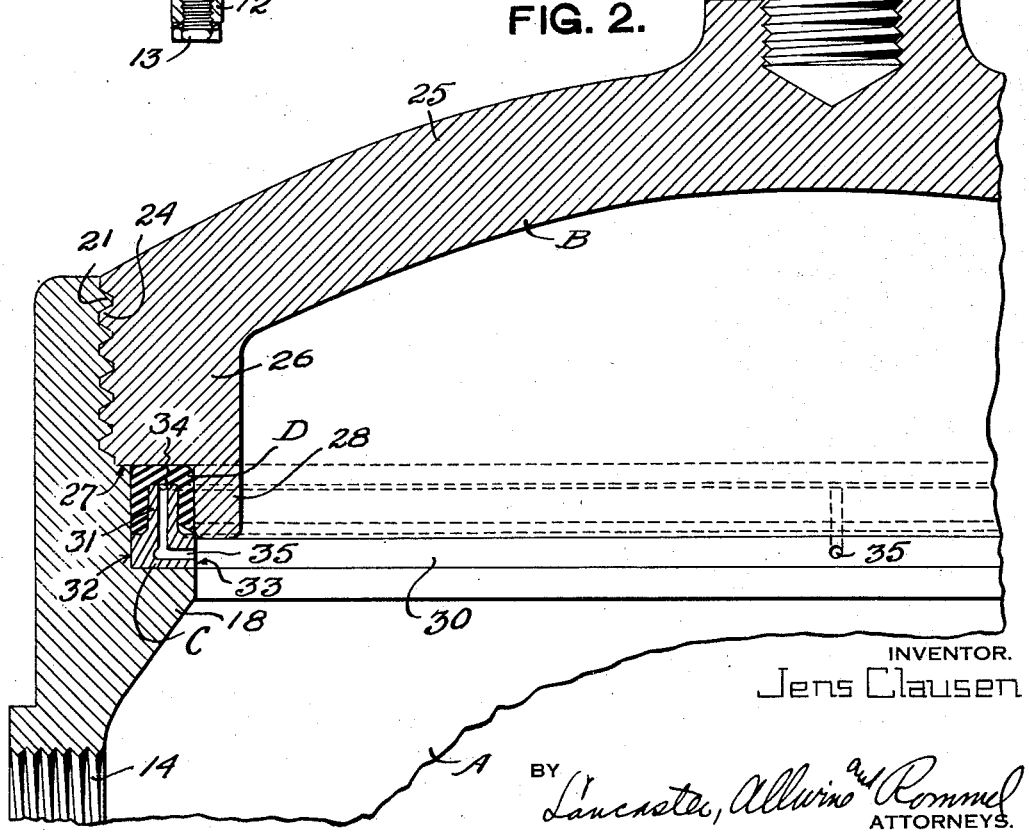
Figure 2 is a detailed sectional view vertically thru the upper portion of the main body of the tank and its cover, showing the sealing means in place.

The gasket D is in the form of an annular channel. It is of distensible material, such as soft rubber or leather, and as shown in the drawings, preferably U-shaped in cross section, and as shown in Figures 2 and 6 having a central portion 40 and flanged side portions 41 and 42, providing a channel 43 for the reception of flange 31 of ring C.

When assembling the gasket D on ring C, it is arranged so that the gasket will embrace the flange 31, with portion 41 of the gasket interposed between the flange 31 and the inner circumferential wall or face of the tank A; the central portion 40 of the gasket engaging between the flange 31 and the marginal face 27 of the cover B, and the portion 42 of the gasket between flange 31 and the outer circumferential face 29 of flange 28. Thus, the gasket side walls 41 and 42 are engaged between the flange 31 and the tank and cover walls, and the bight portion 40 is engaged between the flange 31 and the under surface of the cover, except for the circumferential way provided by groove 34.

In Figures 7 and 8 is shown a modified form of tank, including a seamless cylindrical forged metal main body portion 50, comprising a cylindrical wall 51 and an inwardly extending dome-shaped bottom 52, and a strengthening ring 53 at the upper end portion of the cylindrical wall portion 51. In the example shown, the ring 53 is secured to the main body 50 by companion screw threads 54 and 55, the former being on the interior of a downwardly extending flange 56 of the ring 53 and the latter on the exterior of the upper end portion of cylindrical wall 51. It is, however, to be distinctly understood that this strengthening ring may be attached to the body 50 in any suitable manner, such as by welding. The ring 53 is provided with an inwardly extending circumferential flange 57, intermediate its ends, providing a shoulder 58 for the reception of the shaping ring C hereinbefore referred to. The ring 53 is also provided with an upwardly extending flange 58, provided with screw threads 59, which may be in interrupted, panelled formation, as was explained in connection with Figures 3 and 4, for reception of interrupted threads in panelled formation on the cover B. In this modified form, the screw threaded bores 14 and 15 extend thru the flange 56 of ring 53, and thru the upper end portion of cylindrical wall 51, so that when the fittings 16 and 17 are in place, the ring 53 cannot be moved circumferentially with cover B, when tightening or loosening the cover.

The valve G may be any approved type of automatic safety and manually operable relief valve. In the example shown, it is provided with a handle 60 which may be manually moved to a position to release gas in the tank to the atmosphere. The pipe 17 may be connected to any suitable carbonating apparatus, not shown, the exit of the gas being controlled by valve H.

The liquefier tank is particularly well adapted for use with phase changeable material, such as carbon dioxide, introduced into the tank when in solid, or semi-solid form. After it has been placed in the tank, the cover is quickly turned into place at the filling opening. The carbon dioxide gas given off from the material E builds up pressure in the tank greater than external pressure and finds its way thru ports 35 to the groove 24 and there inflates the gasket D into sealing contact at juncture of the tank and cover.

It will be observed that the direct action of the evolved internal pressure upon the gasket, tending to inflate or distend same, will keep the tank sealed, so that substantially all of the gas may be withdrawn from the tank without the cover becoming unsealed. If it is desired to replenish the supply of material E in the tank, before the pressure in the tank has reached external atmospheric pressure, the excess pressure may be released by manipulation of the handle 60, and then the cover B may be moved with ease, and lifted from the tank.

In describing the invention by aid of the views above referred to, it is desired to point out that same are merely illustrative of examples whereby the invention may be applied in practice, and it is not intended to confine or limit the invention to the precise construction and arrangement of parts shown. The foregoing description is therefore to be broadly construed as including substitute constructions and arrangements of parts which are the obvious equivalents of those defined in the appended claims.

I claim:

1. In combination, a cylindrical tank having a filling opening at one end and a circumferentially extending outwardly facing shoulder in said tank near said opening, a cover detachably carried by the tank at said opening with its marginal portion confronting said shoulder, and having a circumferential face confronting the inner face of the tank, a shaping ring engaging said shoulder and provided with an upstanding annular flange spaced from its inner and outer circumferential margins, said flange having at its upper portion a circumferential groove and one or more ports leading to said groove from the inner circumferential face of the ring, and a distensible gasket of channel shaped cross section embracing the flange of said shaping ring and engaging the inner circumferential face of the tank, and the said marginal portion and circumferential face of the cover.

2. In combination, a cylindrical tank having a filling opening at one end, and a circumferentially extending outwardly facing shoulder in said tank near said opening, a cover detachably carried by the tank at said opening with its marginal portion confronting said shoulder, a shaping ring engaging said shoulder and provided with an upstanding annular flange, said flange having at its upper portion a circumferential groove and one or more ports leading to said groove from the inner circumferential face of the ring, and a gasket having a part overlying said flange and engaging the marginal portion of the cover, and a part interposed between said flange and the inner wall of the tank.

3. As an article of manufacture, a gasket shaping ring having an annular flange normal to the plane of the ring extending from one of its faces, intermediate the inner and outer circumferential margins of the ring, and one or more ports leading from the inner circumferential face of the ring to the outer face of the flange.

4. As an article of manufacture, a gasket shaping ring having an annular flange normal to the plane of the ring extending from one of its faces, intermediate the inner and outer circumferential margins of the ring, said flange provided with a circumferential groove at its end face, and one or more ports leading from the inner circumferential face of the ring to said groove.

5. As an article of manufacture, a gasket shaping ring having a body portion and an annular flange normal thereto, said ring having one or more ports leading from an inner face of the ring to the outer edge of the flange.

6. As an article of manufacture, a gasket shaping ring having a body portion and an annular flange normal thereto, said ring having a circumferential groove at the edge of said flange, and one or more ports leading from an inner face of the ring to said groove.

7. In combination, a seamless, cylindrical, forged metal tank provided with a filling opening at one end and an integral inwardly extending circumferential flange about the open end of the tank providing an outwardly facing shoulder, a cover detachably carried by the tank at said opening with its marginal portion confronting said shoulder, a removable shaping ring resting upon said shoulder and provided with an annular flange, said flange having a circumferential groove and one or more ports leading to said groove from an inner face of the ring, and a gasket seated over said flange and engaging the adjacent surfaces at the juncture of the tank and cover within the tank.

8. In a tank for holding fluid under pressure, the combination of a body for holding the fluid, a closure member therefor, and a distensible gasket having adjacent thin pliable walls of substantially uniform thickness engaged against the inner surfaces of the closure and body at opposite sides of a portion of the joint between the body and closure to form a seal, and a removable shaping member extending into the gasket in embracing engagement with the inner surfaces of the gasket walls and having a peripheral way between the same and the inside of the gasket with ducts leading therethrough to said peripheral way in order to transmit distending pressures from the tank into the gasket way.

9. In a liquefier tank or the like, the combination of a tank body having a chamber for receiving fluids under superatmospheric pressure, said body having an opening thereto, a closure for said opening, a flexible distensible channel-shaped gasket having spaced walls and a bight portion, the bight portion being disposed for sealing at the juncture of the closure and tank body, and a rigid channel-shaped filler portion disposed in the channel of the gasket entirely across the width of the channel and directly in engagement with the inner sides of said spaced walls and having a surface thereof terminating short of the inside of the bight of the channel to define a circumferential way, said rigid channel filler portion having a port therethrough communicating said circumferential way with the interior of the tank whereby pressures existing within the tank when the closure is in place will pass through said port to said circumferential way and inflate said gasket at its bight into sealing contact across the juncture of the closure with the tank body.

10. In a liquefier tank or the like, the combination of a tank body having a chamber for receiving fluids under superatmospheric pressure, said body having an opening thereto, a closure for said opening, a flexible distensible channel-shaped gasket having spaced walls and a bight portion, the bight portion being disposed for sealing at the juncture of the closure and tank body, and a rigid channel-shaped filler portion disposed in the channel of the gasket entirely across the width of the channel and directly in engagement with the inner sides of said spaced walls, said channel filler portion having a port therethrough leading from the inner side of the bight of said gasket to the interior of the tank whereby pressures existing in the tank will pass into the gasket at the bight portion thereof and inflate the same into sealing contact across the juncture of the closure and tank body.

11. In a gasket construction the combination of a ring-shaped gasket of channel cross section, and a rigid filler member extending into the channel way of said gasket entirely across the width thereof in contact with the inner opposite sides of the channel way, said member having a duct therethrough opening exteriorly of the channel and extending into and communicating with the interior of the channel at the bight thereof.

12. In a liquefier tank or the like for holding therein fluids under superatmospheric pressure, the combination of a tank body, a closure for the tank body, a channel-shaped flexible gasket including spaced walls and a bight portion, the latter lying at the inside of the tank across the juncture of the closure and the tank body, a rigid insert filling the width of the channel of said gasket in contact with the inside surfaces of the spaced walls of the gasket having a conduit therethrough for transmitting fluid pressures from within the tank into the channel way of the gasket at the inside of the bight of the gasket so as to inflate the same into sealing contact with the juncture of the closure and the tank body, and means formed with the closure circumferentially engaging the outer surface of a wall of the gasket to cooperate therewith in providing a seal.

13. In a tank for receiving fluids under superatmospheric pressure, such as carbon dioxide, the combination of body part and a closure part, a channel-shaped gasket at the inside of the tank across the juncture of said parts having spaced walls and a bight portion, said gasket being flexible and inflatable, a filler portion in the way of the channel extending across the entire width thereof and in contact with the facing surfaces of the spaced walls of the channel and having a way therein communicating with the interior of the tank for transmission of pressure from the tank into the channel at the bight thereof for pressure sealing the bight of the channel across the juncture of the said body and closure parts, and seal assisting means associated with said parts in engagement at the outer surfaces of the walls of the channel-shaped gasket.

14. In a tank adapted to receive fluids under superatmospheric pressure, the combination of a pressure resistant body having an opening thereto, a closure having means connecting the same to the body for closing said opening, a gasket across the juncture of the closure and tank body at the inside of the tank, the gasket being of hollow channel-shape cross section and including spaced walls and a bight portion, the latter lying across the juncture of the closure and tank body, a rigid shaping member in the channel way of the gasket in engagement with the inside surfaces of the spaced walls and extending entirely across the width of said channel said shaping member having a duct therein to permit pressures within the tank to pass into the passageway for expanding the bight portion of the gasket across the juncture of the closure and tank body, and means within the tank for holding said shaping member in said relation to the gasket.

15. In a tank for holding fluid under pressure, the combination of a metal tank body for holding the fluid, a metal closure member therefor adapted to seat on the body with a metal to metal contact at the joint thereof facing the inside of the tank, the tank body and closure member having spaced facing walls inside of the tank at said joint, a distensible channel-shaped gasket shaped to provide a bight portion and spaced pliable sides, said sides being disposed in the space between said facing tank body and closure walls and engaged against the said walls at opposite sides of the said joint in order to form a seal, and a shaping member extending into the gasket in embracing engagement with the inner surfaces of the gasket sides at opposite sides of said joint, a circumferential space being provided between the end surface of said shaping member and the inside surface of the bight portion of the gasket, the said shaping member having a port therein opening into said circumferential space and having communication with the interior of the tank for the purpose of transmitting gasket distending fluid pressures from the tank into said circumferential space.

JENS CLAUSEN.